United States Patent [19]

Esselborn et al.

[11] Patent Number: 5,583,184
[45] Date of Patent: Dec. 10, 1996

[54] POLYMETHACRYLATE ESTERS, THE ESTER GROUPS OF WHICH IN THE α AND OPTIONALLY ALSO IN THE ω POSITION DIFFER FROM THE ESTER GROUPS IN THE CHAIN

[75] Inventors: Eberhard Esselborn, Essen; Jürgen Fock, Düsseldorf, both of Germany

[73] Assignee: TH. Goldschmidt AG., Essen, Germany

[21] Appl. No.: 501,591

[22] Filed: Jul. 12, 1995

Related U.S. Application Data

[63] Continuation of Ser. No. 187,978, Jan. 28, 1994, abandoned.

[30] Foreign Application Priority Data

Mar. 3, 1993 [DE] Germany .......................... 43 06 537.6

[51] Int. Cl.⁶ ....................................................... C08F 8/14
[52] U.S. Cl. ........................................ 525/330.6; 525/384
[58] Field of Search ........................................... 525/330.6

[56] References Cited

U.S. PATENT DOCUMENTS

| | | | |
|---|---|---|---|
| 5,115,040 | 5/1992 | Fock et al. | 525/330.6 |
| 5,133,898 | 7/1992 | Fock et al. | 525/330.6 |
| 5,338,445 | 8/1994 | Fock et al. | 525/330.6 |

*Primary Examiner*—Bernard Lipman
*Attorney, Agent, or Firm*—Anderson, Kill & Olick P.C.

[57] ABSTRACT

Novel polymethacrylate esters are prepared; the ester groups of which in the α and optionally also in the ω position differ from the ester groups in the chain. The invention furthermore relates to a method for the synthesis of these compounds by transesterification under selected method conditions.

6 Claims, No Drawings

POLYMETHACRYLATE ESTERS, THE ESTER GROUPS OF WHICH IN THE α AND OPTIONALLY ALSO IN THE ω POSITION DIFFER FROM THE ESTER GROUPS IN THE CHAIN

This is a continuation application of Ser. No. 08/187,978, filed Jan. 28, 1994, abandoned.

FIELD OF INVENTION

The invention relates to novel polymethacrylate esters, the ester groups of which in the α and optionally also in the ω position differ from the ester groups in the chain. The invention furthermore relates to a method for the synthesis of these compounds by transesterification.

BACKGROUND INFORMATION AND PRIOR ART

Functionalized polyacrylate esters, which are obtained by the transesterification of alkyl polyacrylate esters (alkyl groups with 1 to 4 carbon atoms) with special alcohols, which generally have functional groups, have recently been described repeatedly, for example, in the German patents 38 42 201 and 38 42 202, as well as in the German Offenlegungsschriften 39 06 702, 40 06 093, 41 23 478, 42 02 187 and 42 24 412. Compared to similar copolymers, these transesterification products have important advantages, such as, for example, a significantly more uniform molecular weight distribution. They are largely free of monomeric fractions. The synthesis of polyacrylate esters, the alcoholic ester component of which has olefinic double bonds, without the formation of higher molecular weight by-products, becomes possible by means of the transesterification method. For example, it is readily possible to transesterify polyacrylate esters with oleyl alcohol and, at the same time, with other compounds having hydroxyl groups.

Transesterification by these methods generally proceeds to the extent of up to about 70% and products with at least approximately random distribution of the alcohols, introduced by the transesterification along the polymer chain, are obtained.

These transesterification methods cannot be carried out without further ado with the corresponding alkyl polymethacrylate esters.

Admittedly, the reaction of polymethacrylate esters with a large excess of diethylaminoethanol at temperatures in excess of 150° C. in the presence of titanares as catalysts is known from Chemical Abstracts 98 (No. 8, 54652f). Polymers are obtained here, a portion of the ester groups of which has been transesterified with diethylaminoethanol. At this temperature, however, relatively non-uniform products are obtained and thermal decomposition products cannot be avoided.

Surprisingly, however, it was found that, by adhering to certain structure parameters for the polymethacrylate esters that are to be reacted and to a suitable selection of process conditions during the transesterification, it is possible to transesterify one or both of the terminally linked ester groups. This enables novel polymethacrylate esters to be synthesized, the ester groups of which in the α and optionally in the ω position deviate from the ester groups in the chain.

OBJECT OF THE INVENTION

An object of the invention is novel polymethacrylate ester of the general formula

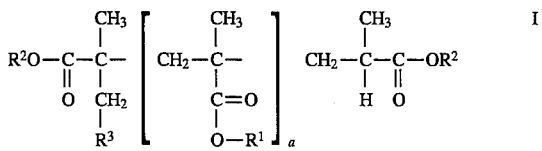

wherein $R^1$ are the same or different and represent alkyl groups with 1 to 8 carbon atoms, perfluoroalkyl groups or dialkylaminoalkyl groups, and $R^2$ represents the $R^1$ groups or groups derived from an alcohol $R^2OH$, $R^3$ represents the group of a known chain regulator, the $R^3$ group being free of active hydrogen atoms, and a is a number which, on the average, is not less than 4, with the proviso that the boiling point of the $R^2OH$ alcohol is higher than that of the $R^1OH$ alcohol and that at least one $R^2$ group in the average molecule is not identical with the $R^1$ group.

The $R^1$ group preferably is a methyl, butyl or octyl group. Examples of suitable perfluoroalkyl groups are the trifluoroethyl, pentafluoropropyl, nonafluorohexyl and tridecafluorooctyl groups.

$R^1$ can also represent a dialkylaminoalkyl group. Examples of particularly suitable dialkylaminoalkyl groups are the dimethylaminoethyl and diethylaminoethyl groups.

The $R^2$ group can have the same meaning as the $R^1$ group or be derived from the alcohol $R^2OH$ which, with respect to the transesterification reaction, must have a higher boiling point than the alcohol $R^1OH$. The boiling point difference should not be less than 10° C. However, the condition must be fulfilled that at least one $R^2$ group in the average molecule is not identical with $R^1$. Preferably, one of the two terminal $R^2$ groups is not identical with $R^1$.

$R^3$ is the group of a known chain regulator, the $R^3$ group being free of active hydrogen atoms. Examples of chain regulators are mercaptans, chloroform and isopropylbenzene. A preferred example of such an $R^3$ group, which originates from a chain regulator, is the $—S—C_{12}H_{25}$ group. Further examples of groups, which originate from the chain regulator, are the group derived from t-dodecylmercaptan, the octadecylmercaptan group and the tetradecylmercaptan group.

The number a has an average value of not less than 4. Preferably, it has a value of 4 to 500, which corresponds to a molecular weight range from about 400 to about 100,000 for the inventive polymer.

Preferred meanings of the $R^2$ group are given in the following sections.

For example, $R^2$ preferably is an alkyl group with a larger number of carbon atoms than $R^1$ or an alkenyl group. The number of carbon atoms can be as high as 30. The alkyl group can optionally be substituted by inert groups, such as halogen groups. $R^2$ can also be an alkenyl group, preferably the allyl, hexenyl or oleyl group or a group of the formula

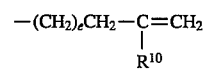

wherein $R^{10}$ is a hydrogen or methyl group and e is a number from 1 to 10.

Furthermore, $R^2$ can preferably be an $—R^4OH$ group, wherein $R^4$ is a divalent aliphatic carbon group with 2 to 20 carbon atoms. Examples of such —R$^4$OH groups are —(CH$_2$)$_2$—OH, —(CH$_2$)$_4$—OH or —(CH$_2$)$_6$—OH.

In a further preferred form, R$^2$ is a —(C$_n$H$_{2n}$O—)$_b$R$^5$ group, wherein R$^5$ is a hydrogen, alkyl, alkaryl, alkenyl or sulfopropyl group, n is a number from 2 to 18 and b is a number not less than 1. Examples of R$^5$ groups are methyl, butyl, stearyl, allyl, hexenyl, nonylphenyl or oleyl groups.

If n is equal to 2, the polyether group exclusively contains oxyethylene units. If the value of n is greater than 2, the polyether group consists of oxyethylene units and proportionally of oxyalkylene units, the number of carbon atoms of which is between 3 and 18. Moreover n can assume only a fractional value between 2 and 18. Preferably the oxyalkylene block consists of oxyethylene units and oxybutylene units can optionally be present in addition to the oxypropylene units. Oxyalkylene units with 4 to 18 carbon atoms are preferred when the transesterification product is to have oleophilic properties.

In a further preferred form, R$^2$ can also be an

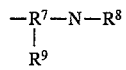

group or a

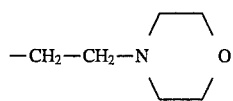

group wherein R$^7$ is a divalent, aliphatic hydrocarbon group with 2 to 4 carbon atoms in the carbon chain or the —(C$_n$H$_{2n}$O—)$_m$C$_p$H$_{2p}$—group and the subscripts have the following values: n=2, 3 or 4; m=1 to 20; p=2, 3 or 4.

R$^8$ and R$^9$ are the same or different and in each case represent alkyl groups with 1 to 18 carbon atoms. The nitrogen atom can be present in protonated or quaternized form.

Examples of such groups are

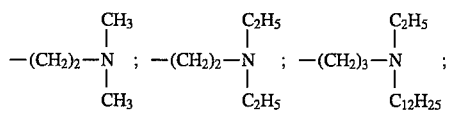

-continued

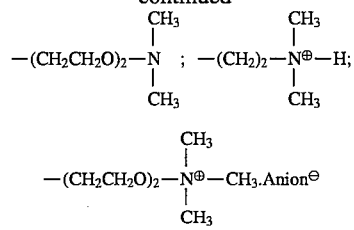

The R$^2$ group can also represent a —(CH$_2$)$_c$C$_d$F$_{2d+1}$ group, wherein c is a number from 2 to 10 and d a number from 1 to 12. Preferred examples of such groups are —(CH$_2$)$_2$—C$_6$F$_{13}$ or —(CH$_2$)$_2$—C$_8$F$_{17}$.

The R$^2$ group can finally represent the

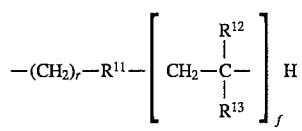

group, wherein

R$^{11}$ is an oxygen or sulfur group,

R$^{12}$ is a hydrogen or methyl group,

R$^{13}$ is a phenyl,

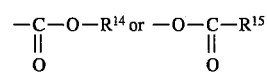

group, wherein

R$^{14}$ is an alkyl, alkylfluoroalkyl or a dialkylaminoalkyl group, the nitrogen atom being present in protonated or quaternized form, R$^{15}$ is an alkyl group, r is a number from 2 to 6 and f is a number from 2 to 100.

Examples of such groups are the ω-hydroxypolystyrene, ω-hydroxypoly-n-butylmethyl acrylate, ω-hydroxypoly(diethylaminoethyl methacrylate) and the ω-hydroxypolyvinylpivalate group.

Examples of inventive polymethacrylate esters are:

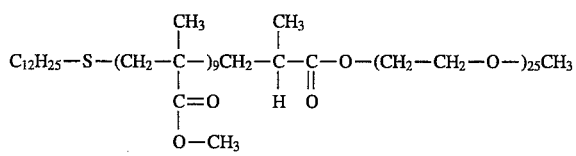

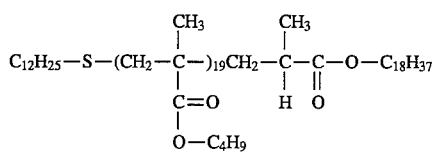

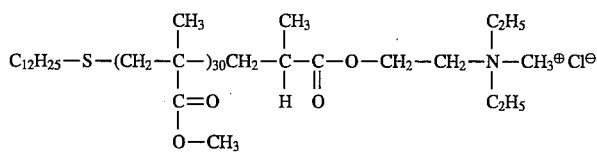

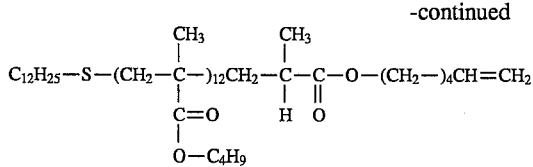

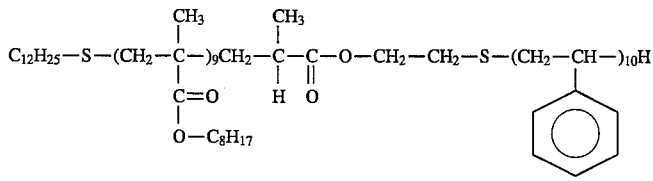

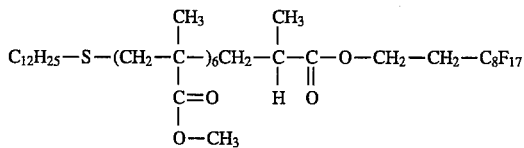

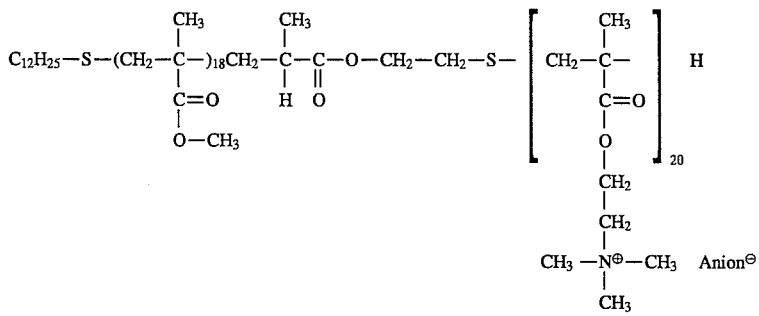

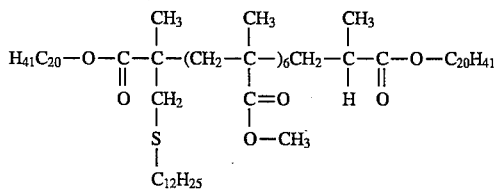

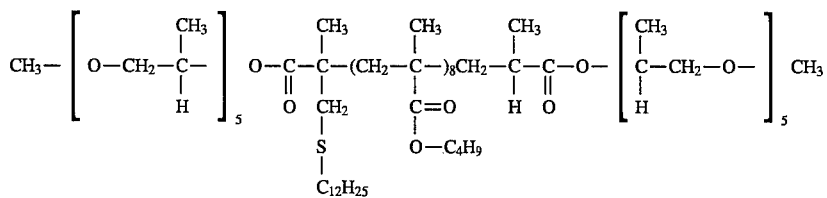

It is clear to one skilled in the art that the new polymethacrylate esters of the general formula I have very interesting application properties, for example, their compatibility with other media can be altered in a desirable manner. This is the case for oleophobicity, the hydrophilicity and the soil-repelling properties. Antistatic properties can be achieved by suitably selecting the alcohols used for the transesterification. If the alcohols, which are used for the transesterification, contain additional functional groups and groups that can react further, such as an OH group or a —CH=CH$_2$ group, the possibility exists of reacting the inventive products further to block copolymers of the ABA or (AB)$_x$ type. By these means, the synthesis of novel block copolymers becomes possible.

A further object of the invention is a method for the synthesis of the inventive, new polymethacrylate esters of Formula I. The inventive method is characterized in that polymethacrylates of the general formula

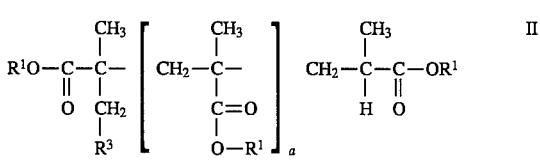

which is obtained by the free radical polymerization in the presence of a chain-length regulator and wherein the R$^1$ and R$^3$ groups and the subscript a have the meanings already given, are transesterified with alcohols of the formula R$^2$OH at temperatures of 70° to 150° C., optionally in the presence of solvents and with the addition of known non-basic transesterification catalysts in a molar ratio of polymethacrylate ester to R$^2$OH of 1:1 to 1:5 and preferably of 1:1 to 1:2.

It was surprising that, under these conditions, the transesterification takes place at only one or at both terminal methacrylate ester groups, depending on the molar ratios employed. The methacrylate esters, present in the chain, are not transesterified or are transesterified only to a subordinate, negligible extent. It is, however, a prerequisite for this that no basic transesterification catalysts, such as alkali methylate, no large excess of alcohols of the formula $R^2OH$ and no reaction temperatures in excess of 150° C. are used.

and amount of chain transfer agent are lowered, as indicated in Table 1. The number average and weight average molecular weights from gel permeation chromatographic analysis are given in Table 1. In all cases, the residual monomer content found is less than 0.1%.

TABLE

| Polymethyl Methacrylate Example No. | n-Dodecyl Mercaptan % by weight | Solids Concentration % by weight | Molecular Weight (GPC) $\bar{M}_n$ GPC | Molecular Weight (GPC) $\bar{M}_w$ GPC | Non-Uniformity Factor |
|---|---|---|---|---|---|
| 1 A | 15.8 | 78.8 | 1114 | 1704 | 1.53 |
| 2 A | 7.9 | 78.8 | 2120 | 3500 | 1.65 |
| 3 A | 5.3 | 78.8 | 3200 | 5900 | 1.84 |
| 4 A | 3.2 | 70.2 | 5400 | 10500 | 1.95 |
| 5 A | 0.25 | 50.6 | 52000 | 115000 | 2.21 |

Preferred transesterification catalysts are alkyl titanate, alkyl zirconate, dialkyl tin acetate halide or dialkyl tin dialkyl esters, which are used in amounts of 0.1 to 2% by weight, based on the polymethacrylate ester. Examples of particularly suitable catalysts are isopropyl titanate, n-propyl zirconate, dibutyl tin acetate chloride, dibutyl tin diacetate and dibutyl tin dilaurate.

The reaction temperature is 70° to 150° C. and preferably 100° to 130° C.

The reaction can be carried out with or without solvents. In the event that a solvent is used, toluene, xylene or a petroleum hydrocarbon fraction with a boiling point range of 70° to 140° C. are available.

The synthesis of the inventive compounds is described in greater detail in the following Examples, it being understood that these Examples are given by way of illustration and not by way of limitation.

EXAMPLE 1 A

Synthesis of Polymethyl Methacrylate By Free Radical Polymerization (not of the Invention)

A solution of 2.04 g of azodiisobutyronitrile and 102 g of n-dodecylmercaptan in 100 g of toluene and 542 g (approximately 5.4 moles) of methyl methacrylate are added over a period of 3 hours to a reactor filled with 70 g of toluene. The solvent in the reactor is at a temperature of 100° C. and under a blanket of nitrogen. Subsequently, a further 1.36 g of azodiisobutyronitrile, dissolved in 13.6 g of methyl ethyl ketone, is added in equal amounts over a period of 1 hour. Finally the reaction mixture is heated for a further hour at the constant temperature of 100° C. At the end of the reaction, the solvent and the residual monomer are distilled off at 130° C./1 torr. A colorless, viscous liquid remains behind. According to gel chromatographic analysis, the polymer obtained has a number average molecular weight of $\bar{M}_{nGPC}$ of 1110 and a weight average molecular weight of $\bar{M}_{wGPC}$ of 1700; the non-uniformity coefficient therefore is 1.53. The residual monomer content is less than 0.1%.

EXAMPLES 2 A to 5 A

Synthesis of Polymethyl Methacrylates of Different Molecular Weights by Free Radical Polymerization (not of the Invention)

The procedure of Example 1 A is followed with the exception that the solids concentration, amount of initiator EXAMPLES 6 A and 7 A Synthesis of Poly-n-Butyl Methacrylates By Free Radical Polymerization (not of the Invention)

The procedure of Example 1 A is followed with the difference that, instead of methyl methacrylate, n-butyl methacrylate is used. In addition, instead of 102 g of n-dodecyl mercaptan, 102 g of tertiary dodecyl mercaptan are used in Example 7 A.

Gel chromatographic analysis reveals that the number average molecular weights $\bar{M}_{nGPC}$ of polymers 6 A/7 A are 1165/1120 and the weight average molecular weights $\bar{M}_{wGPC}$ of polymers 6 A/7 A are 1678/1670. The non-uniformity coefficients therefore are 1.44/1.49. The residual monomer contents were determined to be less than 0.1%.

EXAMPLE 8 A

Synthesis of Poly-2-Ethylhexyl Methacrylate By Free Radical Polymerization (not of the Invention)

The procedure of Example 1 A is followed with the difference that, instead of methyl methacrylate, 542 g (2.8 moles) of 2-ethylhexyl methacrylate are used.

Gel chromatographic analysis reveals that the polymer obtained has a number average molecular weight $\bar{M}_{nGPC}$ of 1173 and a weight average molecular weight $\bar{M}_{wGPC}$ of 1572, so that the non-uniformity coefficient is 1.34. The residual monomer content is determined to be less than 0.1%.

EXAMPLE 9 A

Synthesis of a Methyl Methacrylate/n-Butyl Methacrylate Copolymer By Free Radical Polymerization (not of the Invention)

The procedure of Example 1 A is followed with the difference that, instead of methyl methacrylate, a mixture of 542 g (5.4 moles) of methyl methacrylate and 542 g (3.8 moles) of n-butyl methacrylate is used.

Gel chromatographic analysis reveals that the copolymer obtained has a number average molecular weight $\bar{M}_{nGPC}$ of 2080 and a weight average molecular weight $\bar{M}_{wGPC}$ of 2900; the non-uniformity coefficient therefore is 1.64. The residual monomer content is determined to be less than 0.1%.

EXAMPLE 1 B

Synthesis of an α-Methyl-ω-Hydroxypolyethylene Oxide (not of the Invention)

Methanol (64 g, approximately 2 moles) and 23 g (approximately 0.33 moles) of potassium methylate are added to a reactor. After carefully flushing it with pure nitrogen, the reactor is heated to 110° C. and 2360 g (approximately 54 moles) of ethylene oxide are added at such a rate, that the temperature of the interior of the reactor does not exceed 120° and the pressure does not exceed 6 bar. After the addition of ethylene oxide is completed, the temperature is maintained at 115° C. until a constant pressure indicates the end of the reaction. Finally, unreacted monomers are removed under vacuum at 80° to 90° C.

The product obtained is neutralized with the help of phosphoric acid and the water is removed by distillation, while the potassium phosphate formed is removed by filtration with the help of a filter aid. The molecular weight, determined from the hydroxyl number on the assumption that the functionality is 1, is 1015.

EXAMPLE 2 B

Synthesis of an α-Methyl-ω-Hydroxyethylene Oxide/Propylene Oxide Copolymer (not of the Invention)

The method of Example 1 B is followed with the difference that 32 g (approximately 1 mole) of methanol and 34 g (approximately 0.46 moles) of potassium methylate are used and, instead of ethylene oxide, a mixture of 4196 g (approximately 95 moles) of ethylene oxide and 739 g (approximately 12.7 moles) of propylene oxide are used.

The molecular weight, determined from the hydroxyl number under the assumption that the functionality is 1, is 2940.

EXAMPLE 3 B

Synthesis of an α-Sulfopropyl-ω-Hydroxypolyether (not of the Invention)

To begin with, the procedure of Example 1 B is followed with the difference that, aside from 7 g (approximately 0.1 moles) of potassium methylate, 58 g (approximately 1 mole) of allyl alcohol are used as starting alcohol and an amount of 1016 g (approximately 23.1 moles) of ethylene oxide and 303.6 g (approximately 5.2 moles) of propylene oxide are used.

The molecular weight, calculated from the hydroxyl number under the assumption of a functionality of 1, is 1190. The iodine number leads to the conclusion that the yield of allyl polyether is 90.1%.

The α-allyloxy-ω-hydroxypolyether obtained (1190 g, approximately 1 mole) is mixed with 660 g of water, 376 g of ethanol and 0.8 g of manganese acetate and adjusted to a pH of 8.1 with a 30% sodium hydroxide solution. At a temperature of 25° C., a solution of 114 g (0.6 moles) of sodium pyrosulfite in 270 g of water is added at a temperature of 25° C., while at the same time finely divided air is passed in at a rate of 10 L/h, the pH of 7.5 to 8.5 being maintained by several additions of 30% by weight of sodium hydroxide solution. After a post-reaction period of two hours, the product is neutralized with dilute phosphoric acid and the polyether sulfonate is worked up.

A molecular weight of 1280 is calculated from the hydroxyl number of the product obtained on the assumption that the functionality is 1. A conversion of 98% is calculated from the sulfur content and one of 95% is calculated from the iodine number; the acid number is 0.5.

EXAMPLE 4 B

Synthesis of an ω-Hydroxypolystyrene (not of the Invention)

Xylene (100 g) is heated to 120° C. under an atmosphere of nitrogen in a reactor equipped with a stirrer. Within a period of 3 hours, while maintaining the temperature of 120° C., a mixture of 1560 g (approximately 15 moles) of styrene, 78.1 g (approximately 1 mole) of 2-mercaptoethanol, 4.1 g of azodiisobutyrodinitrile and 310 g of dry xylene is added. At the end of the addition of the mixture, heating is continued for about 15 minutes, after which 0.6 g of methylhydroquinone are added. Excess styrene, 2-mercaptoethanol and xylene are removed by vacuum distillation (60° to 80° C./20 torr). After topping up with xylene, a colorless, viscous solution of the ω-hydroxypolystyrene with a concentration of about 62% by weight is obtained.

Gel chromatographic analysis reveals a number average molecular weight $\overline{M}_{nGPC}$ of 870 and a weight average molecular weight $\overline{M}_{wGPC}$ of 1380; the non-uniformity coefficient therefore is 1.59. A value of $\overline{M}nOsm$ of 820 is obtained by vapor-phase osmometry. With the help of the molecular weight of 875 determined from the hydroxyl number, a functionality of $F_{GPC}=0.99$ can be determined from the gel chromatographic analysis and a functionality of $F_{Osm}=0.94$ can be determined from vapor-phase osmometry.

EXAMPLE 5 B

Synthesis of an ω-Hydroxypoly-2-Ethylhexyl Methacrylate (not of the Invention)

The procedure of Example 4 B is repeated with the exception that, instead of styrene, 520 g (approximately 2.6 moles) of 2-ethylhexyl methacrylate, as well as 29.3 g (approximately 0.37 moles) of 2-mercaptoethanol, 252 g of xylene and 0.275 g of azoisobutyrodinitrile are used; the reaction temperature is 100° C.

Gel chromatographic analysis reveals a number average molecular weight $\overline{M}_{nGPC}$ of 1250 and a weight average molecular weight $\overline{M}_{wGPC}$ of 2075; the non-uniformity coefficient accordingly is 1.66. A value of $\overline{M}_{nOsm}$ of 1270 is obtained by vapor-phase osmometry. A functionality of $F_{GPC}=0.95$ can be obtained from the molecular weight of 1310, obtained with the help of the hydroxyl number, and a functionality of $F_{Osm}=0.97$ can be obtained from the vapor-phase osmometry.

EXAMPLE 1 C

Synthesis of a Polymethyl Methacrylate-Polyethylene Oxide Copolymer (of the Invention)

The polymethyl methacrylate (1110 g, approximately 1 mole) from Example 1 A, 1015 g (approximately 1 mole) of the polyether from Example 1 B and 475 g of toluene are heated under pure nitrogen in a reactor to a temperature of about 120° C. At the same time, the solvent and traces of water are distilled off. At about 100° C., 4.25 g of isopropyl titanate are added. Immediately thereafter, a vacuum of a few torr is applied and the temperature in the interior of the reactor is increased at the same time to about 140° C. The methanol, formed by the reaction taking place, is removed immediately under vacuum. After reacting for 1 hour, there is a second addition of 4.25 g of isopropyl titanate. After about 6 hours, the formation of methanol stops and, with that, the reaction ceases.

Gas chromatographic analysis of the distillate with respect to the amount of methanol obtained leads to the conclusion that the conversion is quantitative. The number average molecular weight $\bar{M}_{nGPC}$, obtained by gel permeation chromatography, is 2026 and the weight average molecular weight $\bar{M}_{wGPC}$ is 2364. The non-uniformity coefficient therefore is calculated to be 1.30.

The water-soluble product, obtained after hydrolysis of the catalyst, is slightly yellowish and has a melting point of 36° C., a density of 1.12 g/cc and a flash point of 196° C.

EXAMPLES 2 C to 9 C

Synthesis of Polymethacrylate/Polyalkylene Oxide Block Copolymers (of the Invention)

Basically, the method of Example 1 C is followed, with the difference that different polymethacrylates and different polyalkylene oxides are used. Aside from the type and amount of polymethacrylate, the type and amount of polyalkylene oxide are given in Table 2. In addition, the number average molecular weight $\bar{M}_n$ and the non-uniformity coefficient are given in this Table. From determining the hydroxyl number and from the gel permeation chromatographic analysis, it can be derived that the conversion is practically quantitative.

about 5 hours at 130° C., the formation of methanol and, with that, the reaction have stopped.

The gravimetric and gas chromatographic determinations of the methanol in the distillate reveal a reaction of polymer and fatty alcohol in the molar ratio of 1:1.10. Gas chromatographic analysis and the determination of the hydroxyl number reveal a reaction in the molar ratio of 1:1.04.

EXAMPLE 11 C

Synthesis of Polymethyl Methacrylate with Two Terminal Stearyl Groups (of the Invention)

The procedure of Example 10 C is followed with the exception that, instead of dibutyl tin chloride acetate, 23 g of isopropyl titanate are used as catalyst and the reaction is carried out at a temperature of 150° C.

The gravimetric and gas chromatographic determinations of the methanol in the distillate reveal a reaction between polymer and fatty alcohol in the molar ratio of 1:1.95. Gas chromatographic analysis of the product and the determination of the hydroxyl number reveal a reaction in the molar ratio of 1:1.97.

EXAMPLE 12 C

Synthesis of Poly-n-Butyl Methacrylate with a Terminal Diethylaminoethyl Group and its Protonated or Quaternized Derivatives (of the Invention)

Poly-n-butyl methacrylate (1165 g, approximately 1 mole) from Example 7 A, 117 g (approximately 1 mole) of diethylaminoethanol and 500 g of xylene are heated to 140° C. under pure nitrogen in a reactor with reflux condenser, the solvent being distilled off under atmospheric pressure, until

TABLE 2

| | | Polymethacrylate | | | | Polyalkylene Oxide Monool | | | |
| --- | --- | --- | --- | --- | --- | --- | --- | --- | --- |
| Example No. | of Example No. | Type | Amount (g) | Moles | of Example No. | Type | Amount (g) | $\bar{M}_n$ GPC | $\bar{M}_w/\bar{M}_n$ |
| 1 C | 1 A | MMA | 1110 | 1 | 1 B | PEO | 1015 | 2026 | 1.30 |
| 2 C | 1 A | MMA | 1110 | 1 | 2 B | PEO/PO | 2940 | 4161 | 1.43 |
| 3 C | 2 A | MMA | 530 | 0.25 | 3 B | PEO/PO—SO$_3$Na | 320 | 2095 | 1.40 |
| 4 C | 3 A | MMA | 640 | 0.2 | 1 B | PEO | 203 | 4220 | 1.66 |
| 5 C | 4 A | MMA | 540 | 0.1 | 1 B | PEO | 102 | 6320 | 2.21 |
| 6 C | 5 A | MMA | 520 | 0.01 | 1 B | PEO | 10.2 | 52600 | 3.82 |
| 7 C | 6 A | BMA | 582 | 0.5 | 3 B | PEO/PO—SO$_3$Na | 640 | 2320 | 1.38 |
| 8 C | 8 A | EHMA | 586 | 0.5 | 1 B | PEO | 507 | 2140 | 1.28 |
| 9 C | 9 A | MMA/BMA | 520 | 0.25 | 1 B | PEO | 254 | 3020 | 1.52 |

EXAMPLE 10 C

Synthesis of Polymethyl Methacrylate with a Terminal Stearyl Group (of the Invention)

The polymethyl methacrylate of Example 1 A (1110 g, approximately 1 mole), 1350 g (approximately 5 moles) of stearyl alcohol and 475 g of toluene are heated under pure nitrogen to 125° C. in a reactor, the solvent and, at the same time, traces of water being distilled off. Subsequently, the temperature is raised to 130° C. and 23 g of dibutyl tin acetate chloride are added; after thorough mixing a vacuum of 10 torr is applied. The methanol set free is removed immediately by suction and condensed in a vapor trap. After visible traces of water no longer are present. Subsequently, 2.1 g of isopropyl titanate are added at 130° C. and stirred. The n-butanol released is separated by fractionation from unreacted diethylaminoethanol and removed. After 1 hour and after 3 hours, the same amount of catalyst is added once again. When the stillhead temperature reaches 135° C., that is, after about 7 hours, the reaction is finished.

The gravimetric and gas chromatographic determinations of the n-butanol, as well as the gas chromatographic analysis and the determination of the hydroxyl number of the yellowish product, reveal a conversion of approximately 96% of the theoretical amount.

The solvent is removed by distillation from 123.5 g (approximately 0.1 mole) of the product obtained as a solution in xylene and replaced by n-propanol. After that, 6.0 g (approximately 0.1 mole) of acetic acid are added and stirred for 1 hour. The pH of a 10% aqueous solution, subsequently determined, is 6.7.

The product dissolved in n-propanol (617 g, approximately 0.5 moles) is heated in a pressure reactor under pure nitrogen to 120° C. After that, sufficient methyl chloride is passed in so that a pressure of 4 bar results. The adjusted pressure is maintained for 4 hours at 120° C. After subsequent cooling to room temperature and the removal of excess methyl chloride, a yellowish product is obtained.

From the determination of the chloride content and the amine number, the conversion is found to be 95% and 99% respectively of the theoretical.

EXAMPLE 13 C

Synthesis of a Polymetnacrylate with a Terminal Alkenyl Group (of the Invention)

The polymethacrylate from Example 1 A (1110 g, approximately 1 mole), 100 g (approximately 1 mole) 6-hexene-1-ol and 1200 g of toluene are heated under pure nitrogen to a temperature of not less than 110° C. in a reactor with fractionating column, the solvent being distilled off under atmospheric pressure until visible traces of water are no longer present. Subsequently, 2.4 g of isopropyl titanate are added at 125° C. The methanol, now set free, is separated from the toluene by fractionation and subsequently condensed. After 1 hour and after 3 hours of reaction, the same amount of catalyst is added once again. When a stillhead temperature of 110° C. is reached, that is, after about 6 hours, the reaction is finished.

The gravimetric and gas chromatographic determinations of the methanol reveal a conversion of 98%. The gas chromatographic analysis and the determination of the hydroxyl number of the yellowish product reveal a conversion of 97% and 98% respectively of the theoretical.

EXAMPLE 14 C

Synthesis of a Polymethyl Methacrylate with a Terminal Perfluoroalkyl Group (of the Invention)

The polymethyl methacrylate of Example 1 A (1110 g, approximately 1 mole), 464 g (approximately 1 mole) of perfluorooctylethanol and 475 g of toluene are heated under pure nitrogen to a temperature of not less than 110° C. in a reactor with fractionating column, the solvent being distilled off under atmospheric pressure until visible traces of water are no longer present. Subsequently, 2.4 g of isopropyl titanate are added at 125° C. The methanol, now set free, is separated from the toluene by fractionation and subsequently condensed. After 1 hour and after 3 hours of reaction, the same amount of catalyst is added once again. When a stillhead temperature of 110° C. is reached, that is, after about 6 hours, the reaction is finished.

The gravimetric and gas chromatographic determinations of the methanol reveal a conversion of 97%. The gas chromatographic analysis and the determination of the hydroxyl number of the yellowish product reveal a conversion of 99% and 97% respectively of the theoretical.

EXAMPLE 15 C

Synthesis of an α, ω-Diol of Polymethyl Methacrylate (of the Invention)

The polymethyl methacrylate of Example 1 A (1110 g, 1 mole), 354 (approximately 3 moles) of hexamethylene glycol and 1400 g of xylene are heated under pure nitrogen to a temperature of 145° C. in a reactor with fractionating column, the solvent being distilled off under atmospheric pressure until visible traces of water are no longer present. Subsequently, 3.7 g of isopropyl titanate are added at 145° C. The methanol, now set free, is separated from the toluene by fractionation and subsequently condensed. After 1 hour and after 3 hours of reaction, the same amount of catalyst is added once again. When a stillhead temperature of 135° C. is reached, that is, after about 12 hours, the reaction is finished.

The gravimetric as well as the gas chromatographic determinations of the methanol in the distillate reveal a reaction, which corresponds to a molar ratio of polymer to diol of 1:1.6. The gas chromatographic analysis of the reaction product that has not been worked up, as well as the determination of the hydroxyl number of the colorless, clear product, obtained after washing 4 times with a 20% aqueous sodium chloride solution, reveal a conversion, which corresponds to a molar ratio of 1:1.7. A functionality of 1.65 is calculated from the molecular weight of 1310, obtained by vapor-phase osmometry, and from the hydroxyl number.

EXAMPLE 16 C

Synthesis of a Polyethylhexyl Methacrylate/Polystyrene Copolymer (of the Invention)

The poly-2-ethylhexyl methacrylate from Example 8 A (1173 g, approximately 1 mole), 870 g (approximately 1 mole) of the polystyrene monool from Example 4 B and 875 g of toluene are heated under pure nitrogen to a temperature of 130° C. in a reactor under a vacuum of 1 torr, the solvent and any traces of water present being distilled off. Subsequently, 8.8 g of isopropyl titanate are added at 145° C. The 2-ethylhexanol, which is set free, is removed under vacuum and condensed in two vapor traps filled with dry ice. After about 10 hours, the reaction is completed as indicated by the fact that 2-ethylhexanol is no longer being set free.

The gravimetric as well as gas chromatographic determinations of the 2-ethylhexanol reveal a conversion of 96% of the theoretical. The gas chromatographic analysis and determination of the hydroxyl number of the yellowish product reveal a conversion of 95% of the theoretical. According to gel permeation chromatographic analysis, the number average molecular weight $\overline{M}_{nGPC}$ is 2010 and the weight average molecular weight $\overline{M}_{wGPC}$ is 2940, from which a nonuniformity coefficient of 1.46 results. The number average molecular weight $\overline{M}_{nGPC}$, as determined by vapor pressure osmometry, is 2230.

EXAMPLE 17 C

Synthesis of a Polymethyl Methacrylate/Poly-2-Ethylhexyl Methacrylate Block Copolymer (of the Invention)

The polymethyl methacrylate of Example 1 A (1110 g, approximately 1 mole), 1250 g (approximately 1 mole) of the poly- 2-ethylhexyl methacrylate monool from Example 5 B and 1037 g of toluene are reacted as described in Example 16 C.

The gravimetric as well as the gas chromatographic determinations of the methanol reveal a conversion of 98% of the theoretical. The determination of the hydroxyl number of the yellowish product reveals a conversion of more than 95% of the theoretical. According to gel chromatographic analysis, the number average molecular weight $\overline{M}_{nGPC}$ is 2320 and the weight average molecular weight $\overline{M}_{wGPC}$ is 3640, from which the non uniformity coefficient is calculated to be 1.57. According to vapor pressure osmometry, the number average molecular weight $\overline{M}_{nOsm}$ is 2270.

We claim:

1. A polymethacrylate ester of the general formula

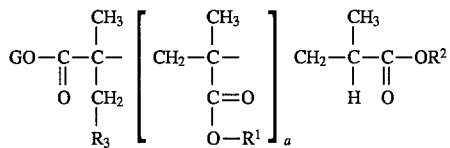

wherein

R$^1$ are the same or different and represent alkyl groups with 1 to 8 carbon atoms, R$^2$ represents a group derived from an alcohol R$^2$ OH, wherein R$^2$ is a C$_2$–C$_{30}$ alkyl group, an —R$^4$OH group, wherein R$^4$ is a divalent aliphatic carbon group with 2 to 20 carbon atoms, or a —(CH$_n$H$_{2n}$O—)$_b$R$^5$ group, wherein R$^5$ is a hydrogen, alkyl or an alkaryl group, n is a number from 2 to 18 and b is a number not less than 1, G represents the R$^1$ groups or R$^2$ groups, R$^3$ represents the group of a known chain regulator, the R$^3$ group being free of active hydrogen atoms, and a is a number which, on the average, is not less than 4, with the proviso that the boiling point of the R$^2$OH alcohol is higher than that of the R$^1$OH alcohol.

2. The polymethacrylate ester of claim 1, comprising that the alkenyl group is a group of the formula

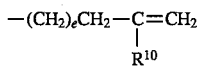

wherein R$^{10}$ is a hydrogen or methyl group and e is a number from 1 to 10.

3. The polymethacrylate ester of claim 1, comprising that the R$^2$ group is an —R$^4$OH group, wherein R$^4$ is a divalent aliphatic hydrocarbon group with 2 to 20 carbon atoms.

4. The polymethacrylate ester of claim 1, comprising that the R$^2$ group is an

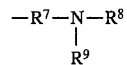

group or a

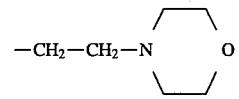

group, wherein R$^7$ is a divalent, aliphatic hydrocarbon group with 2 to 4 carbon atoms in the carbon chain or —(C$_n$H$_{2n}$O—)$_m$C$_p$H$_{2p}$— (n=2, 3 or 4; m=1 to 20; p=2, 3 or 4), R$^8$ and R$^9$ are the same or different and in each case represent alkyl groups with 1 to 18 carbon atoms, and the nitrogen atom being present in protonated or quaternized form.

5. The polymethacrylate ester of claim 1, comprising that the R$^2$ group is a —(CH$_2$)$_c$C$_d$F$_{2d+1}$ group, wherein c is a number from 2 to 10 and d is a number from 1 to 12.

6. The polymethacrylate ester of claim 1, comprising that the R$^2$ group is a

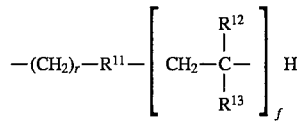

group, wherein

R$^{11}$ is an oxygen or sulfur group,

R$^{12}$ is a hydrogen or methyl group,

R$^{13}$ is a phenyl,

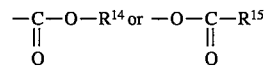

group, wherein

R$^{14}$ is an alkyl, alkylfluoroalkyl or a dialkylaminoalkyl group, the nitrogen atom being present in protonated or quaternized form, R$^{15}$ is an alkyl group, r is a number from 2 to 6 and f is a number from 2 to 100.

* * * * *